US008666588B2

(12) United States Patent
Geilen et al.

(10) Patent No.: US 8,666,588 B2
(45) Date of Patent: Mar. 4, 2014

(54) FRAUD DETECTION IN AN OBD INSPECTION SYSTEM

(75) Inventors: Lothar Geilen, Coral Springs, FL (US);
Bruce R. Kohn, Tucson, AZ (US);
Eugene J. Tierney, Honolulu, HI (US)

(73) Assignee: SysTech International, LLC, Murray, UT (US)

( * ) Notice: Subject to any disclaimer, the term of this patent is extended or adjusted under 35 U.S.C. 154(b) by 0 days.

(21) Appl. No.: 13/482,355

(22) Filed: May 29, 2012

(65) Prior Publication Data

US 2013/0024066 A1    Jan. 24, 2013

Related U.S. Application Data

(60) Provisional application No. 61/490,685, filed on May 27, 2011.

(51) Int. Cl.
*G01M 17/00* (2006.01)

(52) U.S. Cl.
USPC ....... 701/29.6; 701/29.1; 701/29.7; 701/30.3; 702/183; 702/185

(58) Field of Classification Search
USPC .............. 701/29.6, 29.7, 29.1, 30.3; 702/183, 702/185
See application file for complete search history.

(56) References Cited

U.S. PATENT DOCUMENTS 5,896,083 A * 4/1999 Weisman et al. ............. 340/438
6,836,708 B2   12/2004 Tripathi 2005/0060070 A1   3/2005  Kapolka et al.
2007/0250231 A1   10/2007 Tefft et al.
2007/0276561 A1   11/2007 Tripathi et al.

FOREIGN PATENT DOCUMENTS

DE    4335316 A1    5/1995
EP    1333404 A1    9/2001
EP    2360059 A1    2/2010
EP    2498225 A1    3/2011

OTHER PUBLICATIONS

European Search Report issued in connection with European patent application EP 12187452 corresponding to the present application.

* cited by examiner

*Primary Examiner* — Mary Cheung
*Assistant Examiner* — Brian P Sweeney
(74) *Attorney, Agent, or Firm* — Gardner, Linn, Burkhart & Flory, LLP

(57) ABSTRACT

A vehicle testing system and method includes a vehicle testing system that is operatively connected with a vehicle computer whereby the system is able to evaluate signals within the vehicle computer. The system includes a tamper testing sequence for detecting vehicle tampering comprising applying a test action to the vehicle intended to generate a signal in the vehicle computer responsive to the test action, monitoring the signal of the vehicle computer associated with the test action, and determining whether the signal meets an expected response. A determination that the signal of the vehicle computer associated with the test action does not meet the expected response indicates that tampering has occurred.

19 Claims, 3 Drawing Sheets

FRAUD DETECTION IN AN OBD INSPECTION SYSTEM

CROSS REFERENCE TO RELATED APPLICATION

The present application claims priority of U.S. provisional application, Ser. No. 61/490,685 filed May 27, 2011, for FRAUD DETECTION IN AN OBD INSPECTION SYSTEM, which is hereby incorporated herein by reference in its entirety.

BACKGROUND OF THE INVENTION

The present invention is directed to vehicle testing, and in particular to a method and apparatus for detecting whether an on-board diagnosis system of a vehicle has been improperly tampered with or altered.

Modern vehicles include pollution control systems and equipment for controlling and/or limiting the amount of certain types of undesirable emissions. Vehicles also include on-board diagnostic ("OBD") systems including computers and sensors to alert drivers and/or vehicle repair personnel when repairs are needed to maintain the proper operation of the vehicle. As part of environmental policies, numerous states require that vehicles undergo periodic emission testing to ensure that vehicles registered in those states comply with mandated emission requirements, which emission testing may be performed utilizing a vehicles OBD system. Vehicles that do not meet the requirements may not qualify for registration until repairs are made and may be subject to fines. However, vehicles may be improperly tampered with to circumvent such detection. For example, vehicle owners or service companies may alter vehicles in efforts to increase the performance of the vehicles, such as removing catalytic converters or the catalysts from the converter, which alterations negatively impact the vehicles' emissions. As part of such modifications, the vehicle may be altered or tampered with to prevent detection of such modifications, such as by changes to the engine computer and/or OBD system sensors.

SUMMARY OF THE INVENTION

The present invention provides a method and system for detecting whether a vehicle has been improperly tampered with to prevent detecting that the vehicle does not comply with vehicle regulations by detecting improper modification of a vehicle via the vehicles' on-board diagnosis system.

According to an aspect of the present invention, a vehicle testing system and method for detecting vehicle tampering comprises operatively connecting a vehicle testing system with a vehicle computer whereby the vehicle testing system is able to evaluate signals within the vehicle computer with the vehicle testing system including a tamper testing sequence. Vehicle testing includes applying a test action to the vehicle, with the test action intended to generate a signal in the vehicle computer responsive to the test action, monitoring the signal of the vehicle computer associated with the test action, and determining whether the signal responds to the test action consistent with a non-tampered vehicle. A determination that the signal responds inconsistently to a non-tampered vehicle indicates that tampering has occurred. The determining step may be performed by comparing the signal of the vehicle computer to an expected response, including where the expected response comprises a predetermined predicted response.

In particular embodiments, the application of the test action may comprise resetting vehicle on-board diagnostic monitors of the vehicle computer and include monitoring a non-continuous monitor of the vehicle computer to determine whether the non-continuous monitor of the vehicle computer obtains a set condition prior to meeting an expected response. The expected response may be based on time, where the obtaining of a set condition by the non-continuous monitor prior to a predetermined time limit indicates that tampering has occurred.

In still further embodiments, the application of the test action may comprise altering an operational parameter of the vehicle that is intended to cause a change or fluctuation in the level of oxygen in the exhaust stream of the vehicle responsive to the test action. A signal associated with an exhaust gas oxygen sensor positioned downstream of a catalytic converter on the vehicle may be monitored to determine whether the signal changes in response to the test action, including whether a change is consistent with a non-tampered vehicle. The absence of change in the behavior or pattern of the signal or a repetitive signal independent of the test action may be used to indicate that tampering has occurred. Test actions undertaken in such an embodiment may include altering the engine speed of the vehicle and/or temporarily turning off the engine of the vehicle. The signal of the vehicle computer being monitored may be a voltage signal, a normalized transformed signal, or a lambda signal.

The vehicle testing system may include multiple tamper testing sequences, with the method of testing including running more than one of such sequences.

Still further, the vehicle testing device and/or testing method may include performing a standard test sequence prior to performing a tamper test sequence. The vehicle testing device and/or testing method may also include performing a profile test sequence, such as after performing a standard test sequence if a vehicle being tested passes the standard test sequence. The profile test sequence comprises evaluating whether the vehicle being tested matches predetermined criteria, with a tamper test sequence being performed after the profile test sequence if the vehicle being tested matches the predetermined criteria. The predetermined criteria of the profile test may be based on a vehicle make, model and/or manufacturing year.

In particular aspects of the vehicle testing system a computer unit of the system receives vehicle operational data, such as primarily from an engine control unit, but may additionally or alternatively receive data directly from other components, sensors or computer modules, with the computer unit utilizing the vehicle operational data to evaluate whether non-continuous monitors in the engine control unit prematurely obtain a set condition. The computer unit may also evaluate engine control unit monitors prior to transmitting a reset command to the engine control unit, with the reset command only being transmitted if the control unit does not detect out-of-specification conditions.

Still further, the computer unit may be preprogrammed with predetermined criteria and the computer unit may receive vehicle data inputs related to the vehicle being tested. The vehicle being tested may then be compared relative to the predetermined criteria based on the vehicle data inputs with the computer unit only transmitting a reset command if the vehicle data inputs match the predetermined criteria.

The vehicle testing method and apparatus of the present invention provides a convenient test and device for detecting whether a vehicle has been improperly altered or modified via the vehicle's on-board diagnostic system. In particular, the testing method and apparatus provide an expedient manner in which to detect improper efforts to circumvent vehicle emission regulations and testing.

These and other objects, advantages, purposes and features of this invention will become apparent upon review of the following specification in conjunction with the drawings.

DESCRIPTION OF THE PREFERRED EMBODIMENTS

Figure 1:
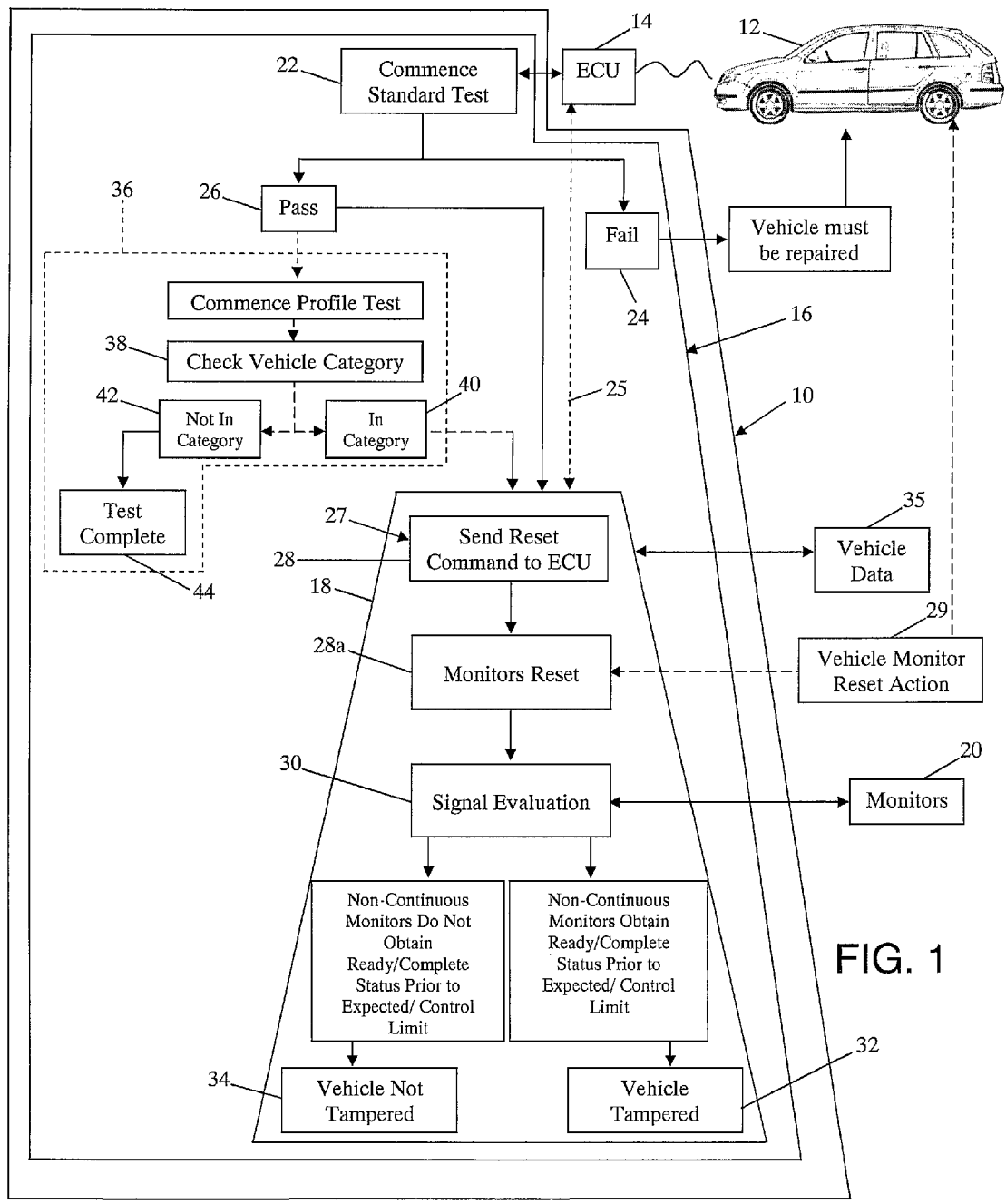
FIG. 1 is a schematic illustration of a testing device and method in accordance with the present invention for detecting tampering of an on-board diagnostic system of a vehicle.

The present invention will now be described with reference to the accompanying figures, wherein the numbered elements in the following written description correspond to like-numbered elements in the figures. FIG. 1 illustrates a vehicle testing system or device 10 configured for connecting or communicating with the on-board diagnostic ("OBD") system of a vehicle 12, such as with a vehicle computer or module or electronic control unit ("ECU") 14 of vehicle 12, for vehicle inspection and maintenance purposes. System 10 may be used in testing of vehicle 12, such as emission testing or otherwise, with system 10 including a computer unit incorporating vehicle test programming or program 16 for evaluating the proper operation of various systems and equipment of vehicle 12. As part of such testing 16, system 10 includes tamper test sequence 18 for evaluating whether vehicle 12 and/or ECU 14 have been improperly modified or tampered with in efforts to avoid detection that vehicle 12 is not configured or operating properly with respect to the emission control systems and equipment of vehicle 12. System 10 may transmit and receive information from ECU 14 via a computer cable link or wirelessly, and may comprise a device and operate as disclosed in U.S. Patent Application Pub. No. US2007/0276561, which is incorporated herein by reference, or may comprise a kiosk type system or handheld type unit. Accordingly, it should be understood that system or device 10 may include either a local or remote computer unit. In the case of a remote computer unit, for example, data collected at one or more locations may be transmitted to a centralized computer unit for processing, such as to evaluate whether the data is consistent with a non-tampered vehicle.

Figure 2:
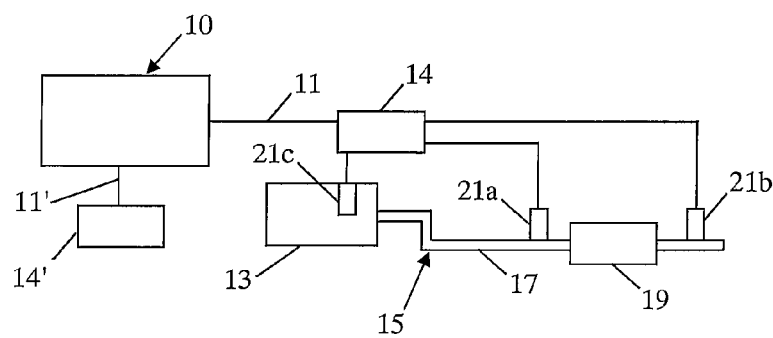
FIG. 2 is a schematic illustration of a testing device in accordance with the present invention interfacing with a vehicle computer in relation to vehicle components and sensors associated with vehicle emissions monitoring.

Vehicle 12 may include various equipment, systems and sensors utilized as part of, or impacting the emission controls/monitoring of vehicle 14, such as one or more oxygen sensors, one or more catalytic converters with sensors for evaluating performance of the catalytic converter, an evaporative system, an exhaust gas recirculation system, various temperature sensors, as well as others. With reference to the schematic illustration of FIG. 2, for example, a vehicle, such as vehicle 12, includes an engine 13, ECU 14 and an exhaust system 15, with system 15 including an exhaust pipe 17 joined with a catalytic converter 19 and sensors, with the illustrated embodiment comprising oxygen sensors 21a, 21b, where sensor 21a is upstream of catalytic converter 19 and sensor 21b is downstream. It should be appreciated that ECU 14 receives signals from alternative sensors as well, such as temperature sensors, and is also able to track other operational occurrences. For example, ECU 14 may also receive signals from sensors associated with engine 13, such as indicated at 21c, which may comprise signals associated with a throttle position, engine temperature, battery voltage, or otherwise. Signals from an engine sensor 21c may be used to provide engine RPM data to ECU 14, for example. It should also be appreciated that vehicle 12 may include one or more ECUs, including ECUs associated with engine, transmission and/or suspension control units, such as shown in FIG. 2 illustrating device 10 interfacing with a second ECU 14' via link 11'. Additional or alternative data may be supplied by an additional ECU 14', such as RPM data from a transmission ECU.

Figure 3:
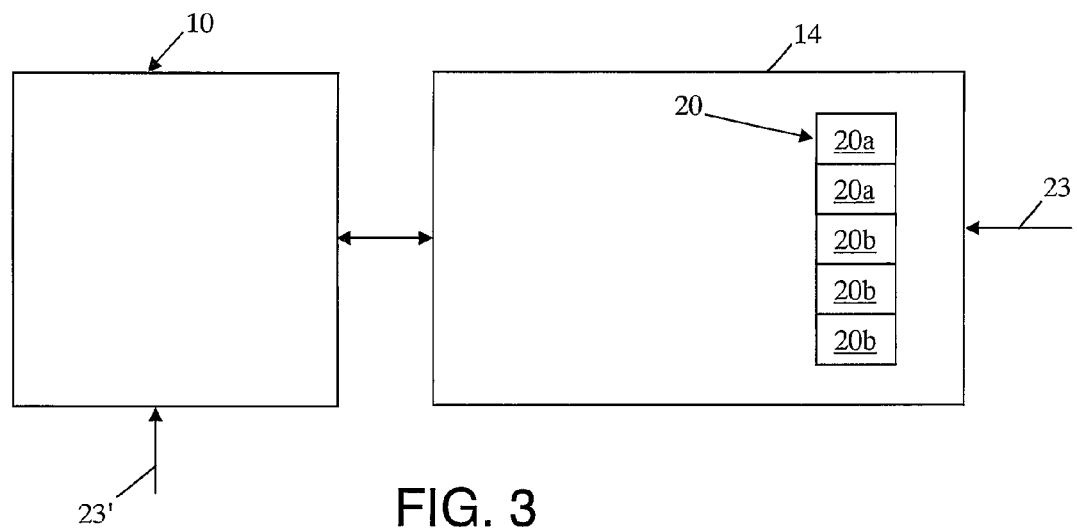
FIG. 3 is a schematic illustration of the vehicle computer of FIG. 2 illustrating on-board diagnostic monitors.

With reference to FIG. 3, ECU 14 receives data signals 23 from various of these devices, such as sensors 21a, 21b, catalyst sensors, as well as other sensors and vehicle data inputs, with ECU 14 including multiple monitors 20 for evaluating whether such signals meet emission requirements, such as if the signals are within predetermined specified operating ranges. If, for example, an oxygen monitor or catalyst monitor detects an out of specification condition, a check engine light or malfunction indicator light ("MIL") may be illuminated on the dashboard of vehicle 12, as well as various codes set within the OBD system of vehicle 12 providing a warning and guidance as to the particular problem. In operation, vehicle testing system 10 operatively connects to ECU 14 via a link 11, such as by a cable connecting to a standardized digital communications port, which in practice may be located within the interior of a vehicle, or via alternative manners as noted above, such as wirelessly. System 10 is thereby able to transmit signals to and read signals from ECU 14. As is conventionally understood, monitors 20 comprise programs or protocols for monitoring the operation of and running diagnostic tests on emissions-related components or systems of a vehicle to verify whether they are operating properly and are within specifications, with the OBD system monitors comprising both continuous and non-continuous monitors. Still further, the OBD system of ECU 14 further includes multiple parameter identification numbers ("PIDs") for obtaining information relative to the vehicle emission diagnostics. For example, OBD PIDs may be as defined in Society of Automotive Engineers publication SAE J1979, which is herein incorporated by reference. As also shown in FIG. 3, system 10 may additionally receive data signals 23' from additional ECUs and/or other vehicle sensors.

In the manner of conventional OBD emission testing programs, vehicle test program 16 of system 10 may also include a standard test sequence 22 used to check/verify whether the monitors 20 of ECU 14 are within proper operating ranges or are out of specification. In the case of a detection of an out of specification condition during test sequence 22, a fail signal 24 would be generated by device 10 alerting that vehicle 12 requires repair. If no out of specification conditions are detected during sequence 18, system 10 would generate a pass signal 26. Still further, such a standard test sequence may be performed by an alternative device or system independent from the vehicle testing system and method of the present invention, in which case the vehicle testing system would proceed directly to performing one or more tamper test sequences, such as indicated at 25 in FIG. 1.

The OBD system of vehicle 12 may be checked as part of a repair or for purposes of vehicle inspection, such as during a required emission test or otherwise. Fraudulent circumvention of such testing may be done, for example, by reprogramming or replacing the OBD "chip" of ECU 14 or installing an emissions test defeat device to ECU 14. Efforts to circumvent detection may be done by a vehicle owner or service shop on a vehicle that has been modified for increased vehicle performance, such as by removal of the catalytic converter or catalysts within a converter. Still further a reprogrammed or replaced chip may be employed that alters the standard engine operation to increase performance, while simultaneously providing circumvention measures. Circumvention efforts may also be undertaken to avoid vehicle repairs necessary to maintain compliance.

Altered ECU chips may not compute monitor readiness per the vehicle manufacturer's algorithm, including not performing any calculations or reporting a fixed value that is set to be within the specified respective monitor ranges of ECU 14 to evade detection of a failing test/check of the vehicle's OBD system as described above. Emission test defeat devices may imitate a vehicle's ECU to act as a simulator of emission conditions and trigger in specification readiness monitor conditions. Such defeat devices also respond to an OBD emission inspection with fixed readiness monitors that are set to ready conditions independent of the actual operation or condition of the vehicle. Thus, these various tampering schemes operate to circumvent detection by, for example, providing signal values to ECU 14 that are within the specified respective monitor ranges of ECU 14 such that no signal codes are generated within the OBD system of vehicle 12 and no check engine light is illuminated. Accordingly, if vehicle 14 were tampered in such manner, test sequence 22 would not detect out of specification conditions as the effected monitors of ECU 14 would be artificially or falsely triggered to in specification conditions.

Therefore, in order to detect such circumvention efforts, testing 16 incorporates tamper test sequence 18. Test sequence 18 includes the sending or applying of a test action 27 to vehicle 12, which test action 27 in the embodiment of FIG. 1 comprises the sending of a monitor reset command 28 that is transmitted to ECU 14. Upon receiving reset command 28, trouble codes within ECU 14 are removed and the monitors 20 within ECU 14 are set to a non-completed or unset status 28a, which is detected by system 10. Under normal, non-tampered conditions, certain of the monitors within ECU 14 comprise continuous monitors 20a that rapidly convert to a set or complete or ready status after receiving reset command 28 and are designed to constantly monitor various devices and/or systems for proper operation, such as misfire and fuel system monitors. Such continuous monitors are thus rapidly able to evaluate whether the associated input signal to the monitor is within proper, mandated specifications.

Other monitors within ECU 14, however, under normal, non-tampered conditions require an extended period or certain operating parameters to occur prior to entering a set or complete or ready status after ECU 14 receives reset command 28 based on certain enabling criteria that may include a time duration, temperature increase, or a driving distance, load or speed. Such monitors may be referred to as non-continuous monitors 20b and include monitors for oxygen and catalyst, as well as others such as for exhaust gas recirculation.

Vehicles that have been tampered with and include an altered chip or the installation of an emissions test defeat device, however, prematurely register a set or complete or ready status for such long term monitors 20b after receiving reset command 28 due to, for example, the tampered system supplying fixed values for such monitors to circumvent detection of out-of-specification conditions. Thus, tamper test sequence 18 evaluates the settings of the monitors at a signal or monitor evaluation step 30 wherein non-continuous monitors 20b within ECU 14 that prematurely reach a set or complete or ready status after transmission of reset command 28, such as immediately or rapidly after having received reset command 28, signal that vehicle 12 has been tampered.

System 10 then provides a signal 32 alerting the tester of the indication that vehicle 14 has been tampered with such that appropriate action may be taken, such as further inspection of the OBD system/vehicle, repairs, and/or alerting appropriate state agencies. If, however, no indication of tampering is detected, system 10 may provide a signal 34 to that effect.

Signal evaluation step 30 thus comprises a comparison of an actual result relative to a predetermined or expected result or limit. For example, tamper test sequence 18 may include time and/or temperature comparison limits whereby a non-continuous monitor 20b is not expected to reach a set or complete or ready status until such limit is met. If however, tamper test sequence 18 determines at monitor evaluation step 30 that a non-continuous monitor 20b reaches a set or complete or ready status prior to such limit, it is considered that the vehicle OBD system has been tapered with and tamper test sequence 18 provides a signal to that effect. For example, monitor evaluation step 30 may involve the monitoring of time, such as based on time since monitor reset 28a or time since engine restart, until a non-continuous monitor 20b resets, with a predetermined time limit being used for comparison as to whether the non-continuous monitor 20b resets in advance of the expected time limit. It should be appreciated that comparisons of an actual result relative to an expected result may be utilized for various non-continuous monitors 20b of ECU 14 such as, for example, for an oxygen sensor monitor, oxygen sensor heater monitor, catalyst monitor, heated catalyst monitor, or otherwise. It should also be appreciated that the predetermined or expected limit used at evaluation step 30 may depend on the particular make and/or model of vehicle undergoing testing.

In a particular operational sequence of tamper test sequence 18, reset command 28 is sent from system 10 to ECU 14 with the vehicle engine not running, but with the key in the ignition switch and the switch placed in the on position, whereby dash lights may be illuminated. Depending on the make and/or model of a vehicle being tested, it may be necessary for the ignition switch to be turned to the off position and then back on again prior to the non-continuous monitors within ECU 14 registering a non-completed or unset status. On still other particular vehicles, it may be necessary to start the engine and then turn it off in order for the non-continuous monitors to register a non-completed or unset status. Accordingly, as illustrated in FIG. 1, tamper test sequence may involve additional steps when reset command 28 does not operate to reset the monitors within ECU, such as shown at 28b. In such instances a vehicle monitor reset action 29 may be required, where vehicle monitor reset action 29 may comprise steps such as turning the ignition switch to off and then back on, and/or turning the engine on and then off, such as discussed above.

Test 16 may optionally further include or incorporate vehicle data inputs 35 into tamper test sequence 18, where vehicle data inputs 35 are collected or recorded by system 10, such as from ECU 14, and may include vehicle operational information or data such as the number of miles driven since restart and the like. Such vehicle data inputs 35 may be incorporated into sequence 18 as part of, or in support of monitor evaluation 30 to aid in determining whether or not the non-continuous monitors prematurely reach a set or complete or ready status.

A large number of vehicles are not likely to be tampered with such that the performance of tamper test sequence 18 may not be warranted in all cases. Testing 16 of system 10 may be programmed, therefore, to optionally include a profile test sequence 36 for evaluating whether to conduct tamper test sequence 18 upon a successful completion of standard test sequence 22. Profile test sequence 36 may receive as an input information for comparison to predetermined criteria for evaluating the necessity of conducting tamper test sequence 18, such as, for example, the make, model and/or year of the vehicle being tested, or information relevant to the registration or registrant of the vehicle. For example, it should be appreciated that certain vehicles, such as certain performance or popularly styled vehicles, are more prone to receive modifications for enhanced performance, such as at automotive service stations referred to as tuner shops. Accordingly, profile test sequence 36 may receive input data regarding the make, model and/or year of the vehicle being tested, with such input data being compared to predetermined criteria preprogrammed into device 10, such as illustrated in FIG. 1 at 38. If the vehicle that is being tested matches such predetermined criteria than it can then be subject to tamper test sequence 18, as indicated in FIG. 1 at 40. If, however, the vehicle is not within a pre-identified category of vehicles that are more prone to being modified, such as indicated at 42, then it may be deemed unnecessary to subject the vehicle to tamper test sequence 18 such that testing 16 is deemed complete 44. Alternative criteria for comparison during profile test sequence 36 may include, for example, the proximity of the vehicle's registration address to a tuner shop.

Figure 4:
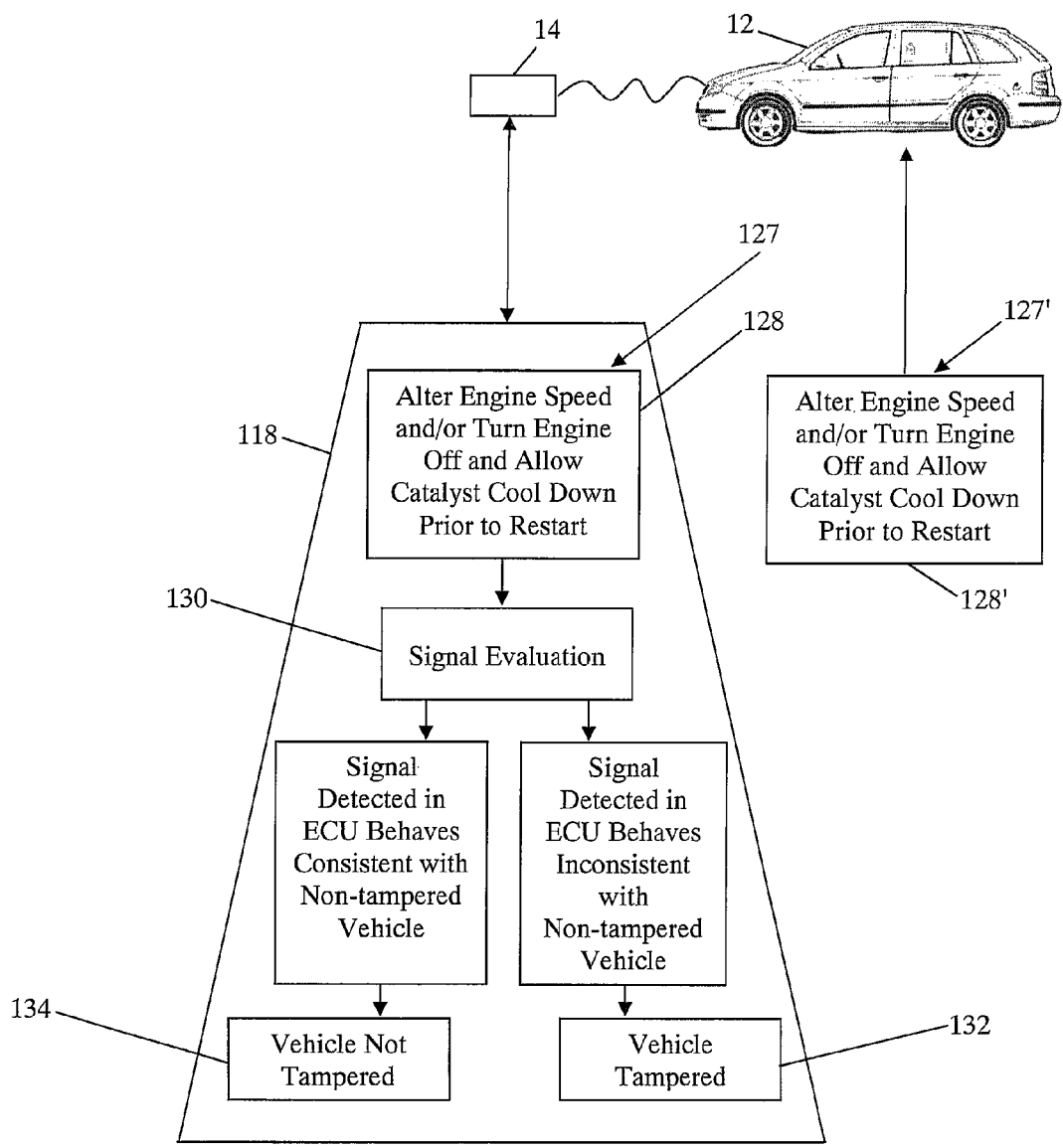
FIG. 4 is a schematic illustration of an additional testing sequence in accordance with the present invention for detecting tampering of an on-board diagnostic system of a vehicle.

Referring now to FIG. 4, an additional tamper test sequence 118 for use with vehicle testing system 10 is illustrated, wherein tamper test sequence 118 may be used in place of or together with tamper test sequence 18. For example, a vehicle testing device may employ one or more tamper test sequences, such as sequences 18 and 118. In applications including multiple sequences, such as sequences 18 and 118, the sequences may be run serially or parallel. Test sequence 118 shares similar aspects or features with sequence 18, with the similar aspects or features of sequence 118 being labeled with 100 added to the corresponding reference numerals of sequence 18.

With reference to FIG. 2, emission testing avoidance measures may also or alternatively include the use of active or passive oxygen sensor simulators with or in place of the oxygen sensor 21b downstream of catalyst 19. In normal operating conditions, oxygen sensor 21b is used to evaluate oxygen levels in the exhaust of exhaust system 15 post catalyst 19. Upon catalyst reaching the proper operating parameters, such as based on temperature, catalyst 19 would use the available oxygen in system 15 to oxidize pollutants whereby oxygen sensor 21b would not register the detection of a triggering level of oxygen, as is conventionally known.

If catalyst 19 is not operating properly, however, oxygen sensor 21b would detect oxygen even upon catalyst 19 reaching the normal operating temperature. Alternatively, vehicle operators may remove the catalyst 19 from exhaust system 15 in efforts to improve performance of a vehicle, in which case oxygen sensor 21b would also detect oxygen as there would be no catalyst present operating to create oxygen consuming reactions. In these cases the signal sent by oxygen sensor 21b to ECU 14 would normally trigger a MIL on the dash of vehicle 12 to alert the driver or a service technician to the problem. A vehicle operator may undertake the use of an active or passive oxygen simulator with regard to sensor 21b in order to prevent detection of this condition, such as to avoid repair costs or to prevent detection of illegal performance modifications.

Passive oxygen simulators include spacer like devices that are employed by first removing the sensor 21b, installing the spacer, and then re-installing the sensor 21b. The spacer functions to remove the sensor 21b from the exhaust stream of exhaust system 15 whereby it is unable to properly detect the oxygen in the exhaust. Such passive oxygen simulators are not readily detectable upon a visual inspection as a technician would visually see the presence of the oxygen sensor 21b and associated electrical connections.

Active oxygen simulators are installed in place of a real oxygen sensor 21b and operate to output a signal, such as a voltage signal, to ECU 14 that falsely represents an in specification condition. That is, even though out of specification oxygen levels would be contained in the exhaust stream, the installed active oxygen simulator would output a signal representing that the catalyst was operating properly, regardless of whether the catalyst is in fact operating or is even present. Examples of signals sent by active oxygen simulators may include a constant, steady state signal or a uniformly repeating signal, such as at a particular frequency and/or signal versus time.

In either scenario of a passive or active oxygen simulator, the signal sent to the ECU 14 would not be responsive to the actual exhaust gas oxygen levels. For example, the simulator may provide a constant signal, such as a constant voltage, even under operating conditions in which a properly operating oxygen sensor 21b would otherwise transmit a changing signal or a fluctuation in the signal. For example, upon first starting a vehicle with a cool catalytic converter and a properly operating oxygen sensor 21b, oxygen would be detected by sensor 21b and the associated signal would be transmitted to ECU 14. During the time the catalytic converter is warming up, the signal from sensor 21b would continue to change until the catalyst reached the proper operating temperature, at which time sensor 21b would output a signal corresponding to an in specification condition associated with no or low oxygen in the exhaust stream. Similarly, if the engine speed of engine 13 is altered, such, as by temporarily increasing and/or decreasing the RPMs of engine 13, the signal from sensor 21b would normally experience a fluctuation as a result of the increased rate of gas and air mixture supplied to engine 13 and corresponding engine exhaust gasses flowing through exhaust system 15.

In similar manner to tamper test sequence 18, sequence 118 may be employed upon obtaining a pass signal 26 from a standard test 22, and/or upon completion of a profile test sequence 36. Also in like manner to sequence 18, tamper test sequence 118 initially includes or commences with the application of a test action 127 to vehicle 12. The test action associated with sequence 118 may comprise an action that would normally cause a fluctuation in the output signal of a downstream oxygen sensor 21b such as, for example, increasing the engine speed of engine 13 and/or temporarily turning engine 13 off and allowing the vehicle components to cool down for a predetermined time limit with the engine 13 subsequently being restarted. These actions are indicated in FIG. 4 at 128. Device 10 may send a signal to ECU 14 that electronically increases engine speed and/or turns engine 13 off, or device 10 may prompt a technician to take such actions, such as a test action 127' indicated at 128' in FIG. 4.

During signal evaluation step 130, a comparison is then made to the actual signal received by ECU 14 that would be associated with a downstream oxygen sensor relative to an expected result based on the applied test action 127 such as, for example, a signal fluctuation in response to the test action. In the event a passive or active oxygen simulator has been employed the signal would not change in response to the test action, but rather would remain unchanged relative to the signal prior to application of the test action. In the scenario of an oxygen simulator generating a constant signal, for example, there would not be a change in signal. Instead, a constant, in-specification signal would be received by ECU 14, which accordingly would indicate that the vehicle has been tampered with whereby a signal 132 would be transmitted alerting a technician to this effect. If, however, upon applying one or both of the above indicated actions 128 a fluctuation in signal responsive to test action 127 was received by ECU 14 and monitored at signal evaluation step 130, it would indicate that the vehicle had not been tampered with and a corresponding signal 134 to this effect would be provided.

It should be appreciated that device 10 may evaluate signals returned via ECU 14 comprising voltage signals, normalized transformed signals, lambda signals, as well as other signal forms depending upon the technical configurations of the ECU 14, which itself may be based on a particular make/model of vehicle, where the ECU 14 is itself processing signals returned from various sensors, such as oxygen and catalyst sensors. Still further, it should also be appreciated that vehicle testing device 10 operates to interrogate or receive information from ECU 14 determining relevant PIDs and monitors 20 for assessing and evaluating whether tampering has occurred to evade detection by the OBD system. This includes determining which PIDs are supported on the vehicle and their various assignments, such as PIDs assigned to various sensors such as the oxygen sensor or sensors downstream from the catalyst. It should further be appreciated that data associated with the OBD system PIDs may be utilized by testing device 10, such as during tamper test sequences 18 and/or 118. For example, certain vehicle OBD systems may support PIDs providing data including distance traveled and/or the number of warm-ups since the codes were cleared, as well as engine RPM and vehicle speed.

It should also be appreciated that the vehicle testing system and method in accordance with the present invention may be performed at locations other than authorized emissions testing facilities. In the case of a hand held device 10, for example, the vehicle testing method may be performed remotely, such as part of an audit by an authorized vehicle inspector or by law enforcement personnel. Such a handheld vehicle testing device 10 may be utilized to perform one or more tamper testing sequences as part of a traffic stop, a random inspection, or otherwise, and need not include performing a standard test of a vehicle's OBD system compliance.

A vehicle testing system and method in accordance with the present invention may involve a determination of whether or not vehicle tampering has occurred while the vehicle is present, such as during testing at an authorized emissions testing facility. Alternatively, data collected from the vehicle may be subsequently analyzed, such as via a remote computer associated with the vehicle testing system, including via comparison with other vehicle tests, to determine whether vehicle tampering has occurred. For example, with reference to U.S. Pat. No. 6,836,708, which is incorporated herein by reference, data from one or more vehicle computers may be transmitted, such as via an OBD scan tool, and transmitted to a data base for evaluation, including for determining whether or not vehicle tampering has occurred. Such evaluation may include statistical evaluation based on results of other vehicle testing to determine whether a vehicle performs within an expected response limit.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A vehicle testing method for detecting vehicle tampering to circumvent emissions testing, said method comprising:
   operatively connecting a vehicle testing system with a vehicle computer whereby said vehicle testing system is able to evaluate signals within the vehicle computer, said vehicle testing system including a tamper testing sequence, wherein said vehicle testing method comprises performing said tamper testing sequence comprising:
   applying a test action to the vehicle, said test action intended to generate a signal in the vehicle computer responsive to said test action;
   monitoring the signal of the vehicle computer associated with said test action, and
   determining whether the signal of the vehicle computer associated with said test action meets an expected response corresponding to a non-tampered vehicle;
   wherein a determination that the signal of the vehicle computer associated with said test action does not meet said expected response indicates that tampering has occurred;
   wherein said applying a test action to the vehicle comprises resetting vehicle on-board diagnostic monitors of the vehicle computer,
   wherein said monitoring the signal of the vehicle computer associated with said test action comprises monitoring a non-continuous monitor of the vehicle computer, and
   wherein said determining whether the signal of the vehicle computer associated with said test action meets said expected response comprises evaluating whether the non-continuous monitor of the vehicle computer obtains a set condition prior to meeting said expected response.

2. The vehicle testing method of claim 1, wherein said evaluating whether a non-continuous monitor of the vehicle computer obtains a set condition prior to meeting the expected response is based on time.

3. The vehicle testing method of claim 2, wherein the obtaining of a set condition by the non-continuous monitor prior to a predetermined time limit indicates that tampering has occurred.

4. A vehicle testing method for detecting vehicle tampering to circumvent emissions testing, said method comprising:
   operatively connecting a vehicle testing system with a vehicle computer whereby said vehicle testing system is able to evaluate signals within the vehicle computer, said vehicle testing system including a tamper testing sequence, wherein said vehicle testing method comprises performing said tamper testing sequence comprising:
   applying a test action to the vehicle, said test action intended to generate a signal in the vehicle computer responsive to said test action;
   monitoring the signal of the vehicle computer associated with said test action, and determining whether the signal of the vehicle computer associated with said test action meets an expected response corresponding to a non-tampered vehicle;

wherein a determination that the signal of the vehicle computer associated with said test action does not meet said expected response indicates that tampering has occurred;

wherein said applying a test action to the vehicle comprises altering an operational parameter of the vehicle that is intended to cause a change in the level of oxygen in the exhaust stream of the vehicle responsive to said test action, wherein said monitoring the signal of the vehicle computer associated with said test action comprises monitoring a signal associated with an exhaust gas oxygen sensor positioned downstream of a catalytic converter on the vehicle, and wherein said determining whether the signal of the vehicle computer associated with said test action meets said expected response comprises evaluating whether the signal of the vehicle computer associated with the downstream oxygen sensor changes in response to said test action.

5. The vehicle testing method of claim 4, wherein the absence of change in the signal of the vehicle computer associated with the downstream oxygen sensor in response to said test action indicates that tampering has occurred.

6. The vehicle testing method of claim 4 wherein said test action comprises altering the engine speed of the vehicle.

7. The vehicle testing method of claim 4 wherein said test action comprises temporarily turning off the engine of the vehicle.

8. The vehicle testing method of claim 4 wherein said monitoring the signal of the vehicle computer associated with said test action comprises monitoring a voltage signal.

9. A vehicle testing method for detecting vehicle tampering to circumvent emissions testing, said method comprising:

operatively connecting a vehicle testing system with a vehicle computer whereby said vehicle testing system is able to evaluate signals within the vehicle computer, said vehicle testing system including more than one tamper testing sequence, and wherein said vehicle testing method comprises performing at least two tamper testing sequences each comprising:

applying a test action to the vehicle, said test action intended to generate a signal in the vehicle computer responsive to said test action;

monitoring the signal of the vehicle computer associated with said test action, and determining whether the signal of the vehicle computer associated with said test action meets an expected response corresponding to a non-tampered vehicle;

wherein a determination that the signal of the vehicle computer associated with said test action does not meet said expected response indicates that tampering has occurred.

10. The vehicle testing method of claim 9, wherein said applying a test action to the vehicle for one of said tamper testing sequences being performed comprises resetting vehicle on-board diagnostic monitors of the vehicle computer, with said monitoring the signal of the vehicle computer associated with said test action comprising monitoring a non-continuous monitor of the vehicle computer and said determining whether the signal of the vehicle computer associated with said test action meets said expected response comprising evaluating whether the non-continuous monitor of the vehicle computer obtains a set condition prior to meeting said expected response.

11. The vehicle testing method of claim 9, wherein said applying a test action to the vehicle for one of said tamper testing sequences being performed comprises altering an operational parameter of the vehicle that is intended to cause a change in the level of oxygen in the exhaust stream of the vehicle, with said monitoring the signal of the vehicle computer associated with said test action comprising monitoring a signal associated with an exhaust gas oxygen sensor positioned downstream of a catalytic converter on the vehicle and said determining whether the signal of the vehicle computer associated with said test action meets said expected response comprising evaluating whether the signal of the vehicle computer associated with the downstream oxygen sensor changes in response to said test action.

12. A vehicle testing method for detecting vehicle tampering to circumvent emissions testing, said method comprising:

operatively connecting a vehicle testing system with a vehicle computer whereby said vehicle testing system is able to evaluate signals within the vehicle computer, said vehicle testing system including a tamper testing sequence, wherein said vehicle testing method comprises performing said tamper testing sequence comprising:

applying a test action to the vehicle, said test action intended to generate a signal in the vehicle computer responsive to said test action;

monitoring the signal of the vehicle computer associated with said test action, and determining whether the signal of the vehicle computer associated with said test action meets an expected response corresponding to a non-tampered vehicle;

wherein a determination that the signal of the vehicle computer associated with said test action does not meet said expected response indicates that tampering has occurred;

said vehicle testing method further including performing a standard test sequence prior to said performing a tamper test sequence, said standard test sequence comprising evaluating on-board system monitors for out-of-specification conditions.

13. A vehicle testing method for detecting vehicle tampering to circumvent emissions testing, said method comprising:

operatively connecting a vehicle testing system with a vehicle computer whereby said vehicle testing system is able to evaluate signals within the vehicle computer, said vehicle testing system including a tamper testing sequence, wherein said vehicle testing method comprises performing said tamper testing sequence comprising:

applying a test action to the vehicle, said test action intended to generate a signal in the vehicle computer responsive to said test action;

monitoring the signal of the vehicle computer associated with said test action, and determining whether the signal of the vehicle computer associated with said test action meets an expected response corresponding to a non-tampered vehicle;

wherein a determination that the signal of the vehicle computer associated with said test action does not meet said expected response indicates that tampering has occurred;

said vehicle testing method further including performing a profile test sequence, wherein said performing a profile test sequence comprises evaluating whether the vehicle being tested matches predetermined criteria, and wherein said performing a tamper test sequence is performed after said profile test sequence if the vehicle being tested matches the predetermined criteria.

14. The method of claim 13 wherein the predetermined criteria of the profile test comprises at least one of a vehicle make, model or manufacturing year.

15. A vehicle testing system for detecting vehicle tampering to circumvent emission testing, said system comprising:
  a testing device that is operatively connectable to a vehicle computer of a vehicle for receiving data from the vehicle computer;
  said testing system programmed to include a tamper testing sequence, said tamper testing sequence operable to monitor a signal of the vehicle computer when the vehicle is subject to a test action during testing of the vehicle;
  said vehicle testing system further operable to evaluate the signal of the vehicle computer to determine whether the signal responds to the test action consistent with a non-tampered vehicle;
  wherein a determination that the signal of the vehicle computer does not respond consistent with a non-tampered vehicle results in an assessment that tampering has occurred;
  wherein the tamper testing sequence is operable to transmit a monitor reset command from said testing device to the vehicle computer of a vehicle being tested with said monitor reset command comprising said test action, and wherein said testing device monitors a signal associated with a non-continuous monitor of the vehicle computer.

16. A vehicle testing system for detecting vehicle tampering to circumvent emission testing, said system comprising:
  a testing device that is operatively connectable to a vehicle computer of a vehicle for receiving data from the vehicle computer;
  said testing system programmed to include a tamper testing sequence, said tamper testing sequence operable to monitor a signal of the vehicle computer when the vehicle is subject to a test action during testing of the vehicle;
  said vehicle testing system further operable to evaluate the signal of the vehicle computer to determine whether the signal responds to the test action consistent with a non-tampered vehicle;
  wherein a determination that the signal of the vehicle computer does not respond consistent with a non-tampered vehicle results in an assessment that tampering has occurred;
  wherein said testing device monitors a signal of the vehicle computer associated with an exhaust gas oxygen sensor positioned downstream of a catalytic converter on the vehicle.

17. A vehicle testing method for detecting vehicle tampering to circumvent emission testing, said method comprising:
  operatively connecting a vehicle testing system with a vehicle computer whereby said vehicle testing system is able to evaluate signals within the vehicle computer, said vehicle testing system including first and second tamper testing sequences each comprising:
    applying a test action to the vehicle, said test action intended to generate a signal in the vehicle computer responsive to said test action;
    monitoring the signal of the vehicle computer associated with said test action; and
    determining whether the signal of the vehicle computer associated with said test action meets an expected response corresponding to a non-tampered vehicle;
    wherein a determination that the signal of the vehicle computer associated with said test action does not meet said expected response indicates that tampering has occurred,
    wherein said applying a test action to the vehicle for said first tamper testing sequence comprises resetting vehicle on-board diagnostic monitors of the vehicle computer, with said monitoring the signal of the vehicle computer associated with said test action comprising monitoring a non-continuous monitor of the vehicle computer and said determining whether the signal of the vehicle computer associated with said test action meets said expected response comprising evaluating whether the non-continuous monitor of the vehicle computer obtains a set condition prior to meeting said expected response, and
    wherein said applying a test action to the vehicle for said second tamper testing sequence comprises altering an operational parameter of the vehicle that is intended to cause a change in the level of oxygen in the exhaust stream of the vehicle, with said monitoring the signal of the vehicle computer associated with said test action comprising monitoring a signal associated with an exhaust gas oxygen sensor positioned downstream of a catalytic converter on the vehicle and said determining whether the signal of the vehicle computer associated with said test action meets said expected response comprising evaluating whether the signal of the vehicle computer associated with the downstream oxygen sensor changes in response to said test action.

18. A vehicle testing method for detecting vehicle tampering to circumvent emission testing, said method comprising:
  operatively connecting a vehicle testing system with a vehicle computer whereby said vehicle testing system is able to evaluate signals within the vehicle computer, said vehicle testing system including a tamper testing sequence, wherein said vehicle testing method comprises performing said tamper testing sequence comprising:
    applying a test action to the vehicle, said test action intended to generate a signal in the vehicle computer responsive to said test action;
    monitoring the signal of the vehicle computer associated with said test action; and
    determining whether the signal of the vehicle computer associated with said test action responds to said test action consistent with a non-tampered vehicle;
    wherein a determination that the signal of the vehicle computer associated with said test action responds inconsistently to a non-tampered vehicle indicates that tampering has occurred; and
    wherein said determining whether the signal of the vehicle computer associated with said test action is consistent with a non-tampered vehicle comprises comparing the signal of the vehicle computer to an expected response.

19. The vehicle testing method of claim 18, wherein said expected response comprises a predetermined predicted response.

* * * * *